(12) United States Patent
Huang

(10) Patent No.: US 9,998,165 B2
(45) Date of Patent: Jun. 12, 2018

(54) MULTI-PURPOSE PORTABLE POWER BANK AND/OR MOBILE PHONE FIXING DEVICE

(71) Applicant: INDEX MEASURING TAPE CO., LTD., Taipei (TW)

(72) Inventor: Jason Huang, Taipei (TW)

(73) Assignee: INDEX MEASURING TAPE CO., LTD., Taipei (TW)

( * ) Notice: Subject to any disclaimer, the term of this patent is extended or adjusted under 35 U.S.C. 154(b) by 0 days. days.

(21) Appl. No.: 15/488,601

(22) Filed: Apr. 17, 2017

(65) Prior Publication Data

US 2018/0097537 A1 Apr. 5, 2018

(30) Foreign Application Priority Data

Oct. 4, 2016 (TW) .............................. 105215016 U

(51) Int. Cl.

| H04B 1/38 | (2015.01) |
|---|---|
| H04B 1/3883 | (2015.01) |
| H04M 1/04 | (2006.01) |
| H04B 1/3888 | (2015.01) |
| B62J 11/00 | (2006.01) |
| H04M 1/02 | (2006.01) |

(52) U.S. Cl.
CPC ............ H04B 1/3883 (2013.01); B62J 11/00 (2013.01); H04B 1/3888 (2013.01); H04M 1/04 (2013.01); *H04M 2001/0204* (2013.01)

(58) Field of Classification Search
CPC ............................ H04B 1/3883; H04B 1/3888

USPC ............................................. 455/575.1, 575.8
See application file for complete search history.

(56) References Cited

U.S. PATENT DOCUMENTS

| 6,108,822 A * | 8/2000 | Calagui | A44B 11/22 2/338 |
|---|---|---|---|
| 2008/0099642 A1* | 5/2008 | Schoonover | B62J 9/003 248/230.1 |
| 2013/0214019 A1* | 8/2013 | Wu | B62J 11/00 224/413 |
| 2015/0138426 A1* | 5/2015 | Chang | G03B 3/10 348/345 |
| 2016/0105209 A1* | 4/2016 | Dunn | H04B 1/3888 455/575.8 |

* cited by examiner

*Primary Examiner* — Raj Chakraborty
(74) *Attorney, Agent, or Firm* — Bacon & Thomas, PLLC

(57) ABSTRACT

A multi-purpose portable power bank and/or a mobile phone fixing device includes a bearing seat and an elastic tightening element. One side of the bearing seat is provided with a fitting and pressure bar for accommodating a mobile phone, and the opposite side thereof is provided with a tightening and pressure bar for accommodating a power bank. One end of a base of the elastic tightening element is provided with a recess to be bonded to a rod, and one end of the recess is provided with an outwardly extending strap. The opposite end of the base is provided with a steel buckle plate; whereby the bearing seat enables the mobile phone and the power bank to be assembled together, such that the mobile phone can be charged at any time. The bearing seat can be quickly mounted to the rod through the elastic tightening element, such that a rider can view the mobile phone screen directly.

5 Claims, 7 Drawing Sheets

MULTI-PURPOSE PORTABLE POWER BANK AND/OR MOBILE PHONE FIXING DEVICE

BACKGROUND OF THE INVENTION

1. Field of the Invention

The present invention relates to a fixing device, particularly to a fixing device which enables a mobile phone to be charged by a power bank at any time when the power bank and the mobile phone are assembled into one, and the assembly of the power bank and the mobile phone can be quickly mounted to a bicycle for a rider to receive a message and answer a phone call at any time.

2. Description of the Related Art

With the rapid development of electronic technology and network technology, smart phone has long replaced the general telephone or notepad and become indispensable supplies. Nowadays, many things in daily life may have been achieved through the smart mobile.

In general, people riding a bicycle or motorcycle often put their mobile phone in the pocket such that they can hear mobile phone ringtones and answer. As the bicycle shakes due to uneven pavement when traveling, the case of a mobile phone falling out of a pocket occurs frequently.

To improve the aforementioned situation, the R.O.C. Patent Publication No, M266651 has disclosed a "Structural Improvement of Car Mobile Phone Holder", which is composed of a mobile phone accommodating box, a clip ring, a connecting element, and a surrounding clip assembly. The mobile phone accommodating box is a ⊂-shaped box body. A clamping device is vertically disposed at the middle of the rear wall of the mobile phone accommodating box; the clip ring is disposed in parallel with the middle of the rear wall of the mobile phone accommodating box, and a flexible clip ring is disposed at the lower part of the clip ring; the connecting element is a polygonal cylinder with a left threaded hole and a right threaded hole at both ends; the surrounding clip assembly is formed by a upper clip element, a lower clip element, and a locking element; the car mobile phone holder can be clamped to the steering wheel through the clip ring, and the car mobile phone holder can be clamped to the edge of a dashboard through an upper clip and a lower clip of the surrounding clip assembly. Accordingly, the car mobile phone holder allows for the mobile phone to be mounted fixedly and accessed easily.

However, since its structure is too complex and not suitable for installation on the high mobility bicycle or motorcycle, and its constituent element is a steel structure, a mobile phone may be damaged easily after put in as the bicycle travels and shakes.

In view of this, after a long period of research in conjunction with improvement on the aforementioned deficiency, a multi-purpose portable power bank and/or mobile phone fixing device of the present invention is eventually presented by the inventor.

SUMMARY OF THE INVENTION

Accordingly, it is an objective of the present invention to provide a multi-purpose portable power bank and/or a mobile phone fixing device, by which a mobile phone and a power bank can be quickly assembled into one, and the mobile phone can be charged by the power bank at any time.

It is a secondary objective of the present invention to provide a multi-purpose portable power bank and/or a mobile phone fixing device in which a mobile phone and a power bank can be assembled by providing a bearing seat, which can be quickly installed on a bicycle, motorcycle, or other motor bicycle through an elastic tightening element.

It is another objective of the present invention to provide a multi-purpose portable power bank and/or a mobile phone fixing device, wherein one end of a base of the elastic tightening element is provided with a recess to be bonded to the rod of the bicycle. The edge of the recess is integrally extending outwardly with a strap, and the opposite side of the base is provided with a steel buckle plate. The base can be fixed to the rod of the bicycle through the strap.

It is a further objective of the present invention to provide a multi-purpose portable power bank and/or mobile phone fixing device, wherein both the bearing seat and the elastic tightening element are made of elastic rubber material, such that the fixing device has a shock effect when a mobile phone and a power bank are mounted to the bearing seat.

It is still another objective of the present invention to provide a multi-purpose portable power bank and/or a mobile phone fixing device, wherein when the bearing seat of the mobile phone is installed on a bicycle or motorcycle, the mobile phone screen is facing upwards such that the rider can view a message, make a call or search the web directly on the screen at any time.

The objectives, shape, configuration, device characteristics and effectiveness of the present invention will be described in detail hereafter with reference to the following embodiments in conjunction with the accompanying drawings.

DETAILED DESCRIPTION OF THE PREFERRED EMBODIMENT

Figure 1:
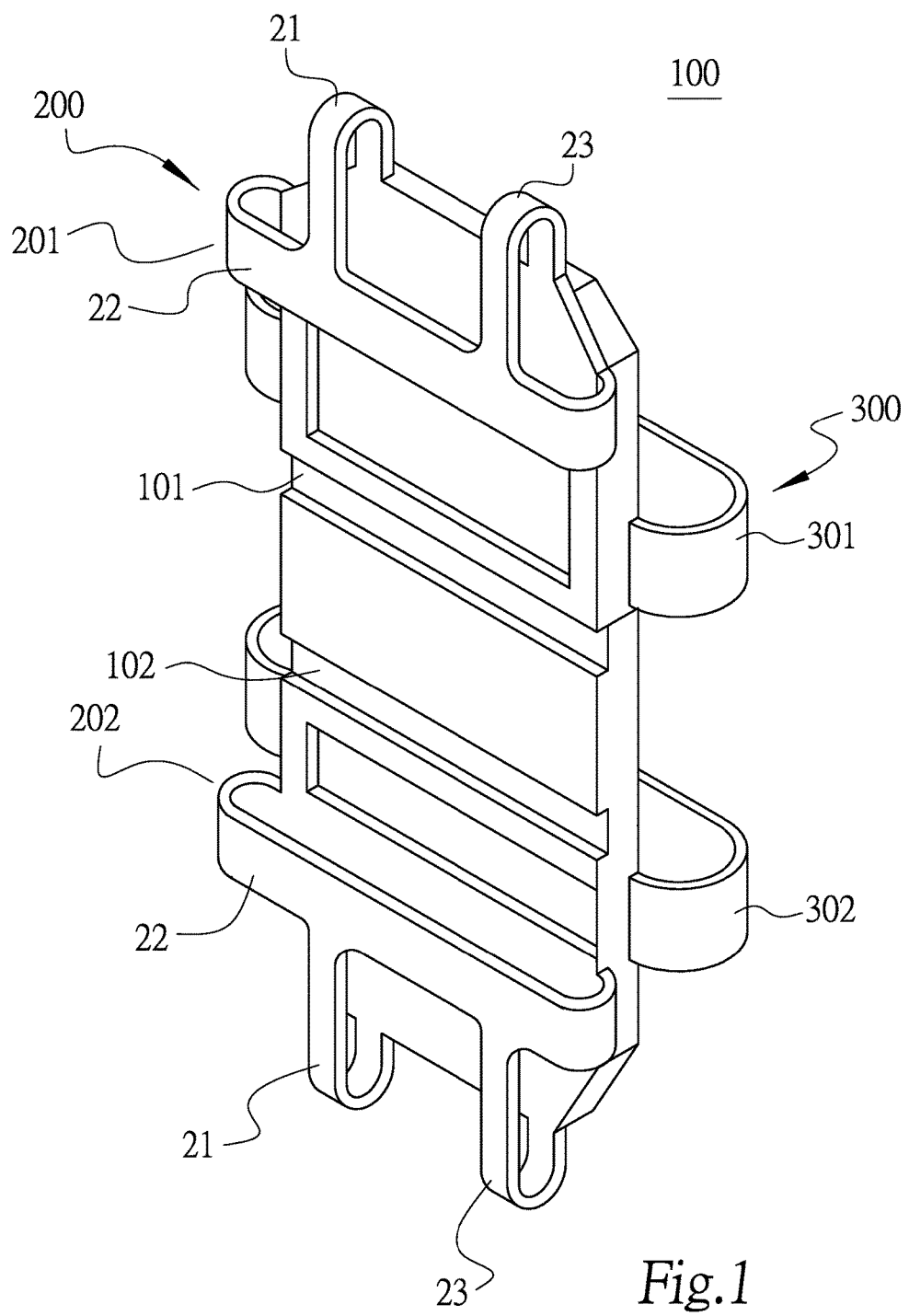
FIG. 1 is a perspective view of a bearing seat of a multi-purpose portable power bank and/or a mobile phone fixing device in the present invention.

A multi-purpose portable power bank and/or a mobile phone fixing device in the present invention, as shown in FIG. 1, is provided with a bearing seat 100. The bearing seat 100 is made of elastic rubber (such as plastic, rubber or silicone). The surface of the bearing seat 100 is provided with two compartment slots 101, 102.

As shown, a set of fitting and pressure bar 200 is formed at one side of the bearing seat 100, and a set of tightening and pressure bar 300 is formed at the opposite side thereof integrally; the fitting and pressure bar 200 includes an upper pressure bar 201 at an upper end and a lower pressure bar 202 at a lower end. The upper pressure bar 201 and the lower pressure bar 202 are connected by two spaced vertical bars 21, 23 and a horizontal bar 22 to form a ring. The distance between the upper pressure bar 201 and the lower pressure bar 202 allows various mobile phones with a variety of sizes to be disposed therein. After put in, the mobile phone can be clamped elastically and fixed by the upper pressure bar 201 and the lower pressure bar 202.

As shown, the tightening and pressure bar 300 provided on the opposite side of the bearing seat 100 includes an upper tightening and pressure bar 301 at the upper end and a lower tightening and pressure bar 302 at the lower end. The upper tightening and pressure bar 301 and the lower tightening and pressure bar 302 are both ring shaped and have elasticity such that the power bank with different sizes can be placed and elastically tightened.

Figure 2:
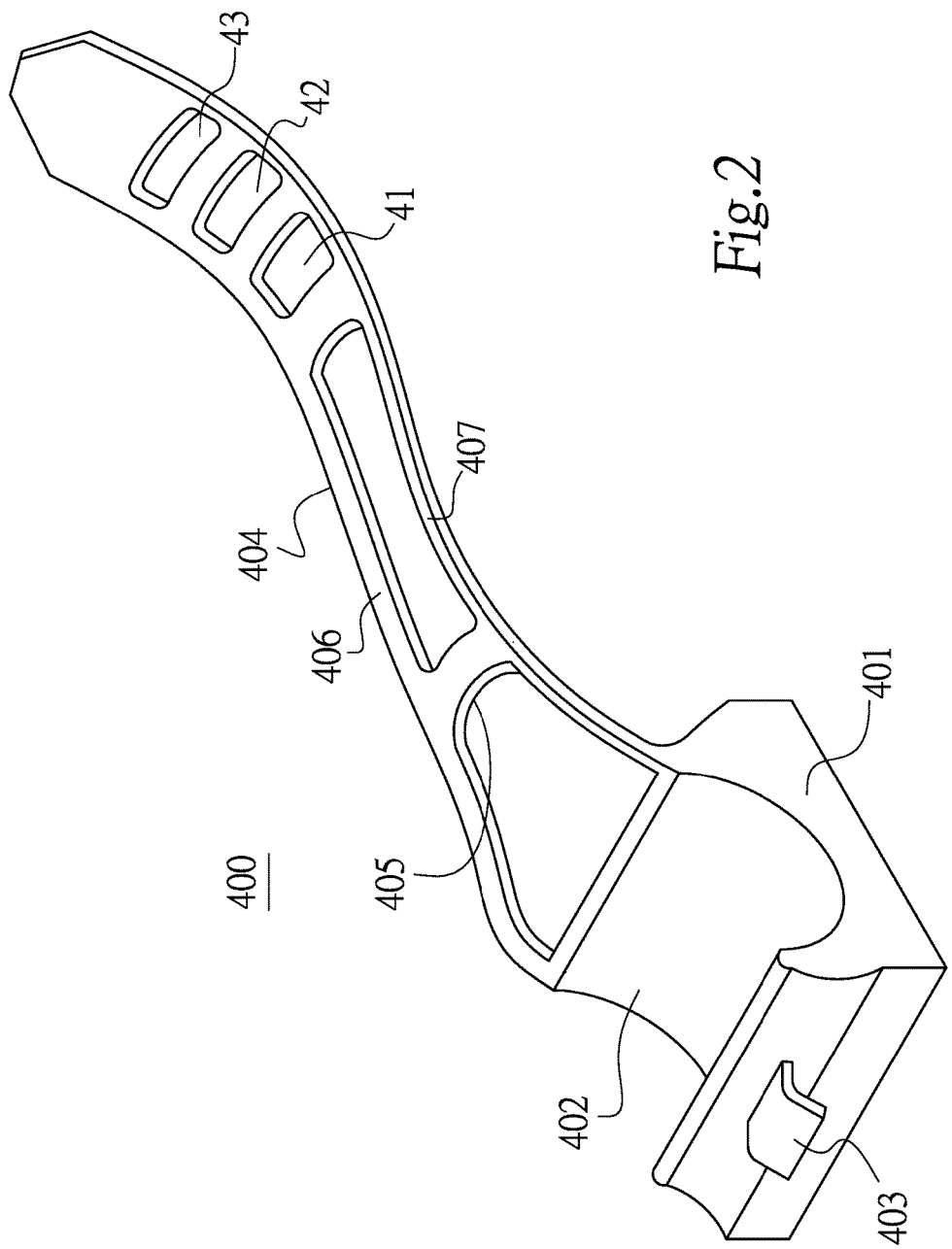
FIG. 2 is a perspective view of an elastic tightening element of a multi-purpose portable power bank and/or a mobile phone fixing device in the present invention.

Please refer to FIG. 2. The multi-purpose portable power bank and/or mobile phone fixing device in the present invention is also provided with an elastic tightening element 400 which is made of elastic rubber (e.g. plastic, rubber or silicone). The elastic tightening element 400 includes a base 401. The base 401 is provided with a recess 402 at one end and a recurved steel buckle plate 403 at the opposite end. The steel buckle plate 403 is preferably made of metal. One end of the recess 402 is provided with a strap 104 extending integrally outwardly. A plurality of button holes 41, 42, 43 and a first buckle portion 405 are provided on the strap 404. Its body is partially hollowed out by an intermediate side to form side bars 406, 407.

Figure 3:
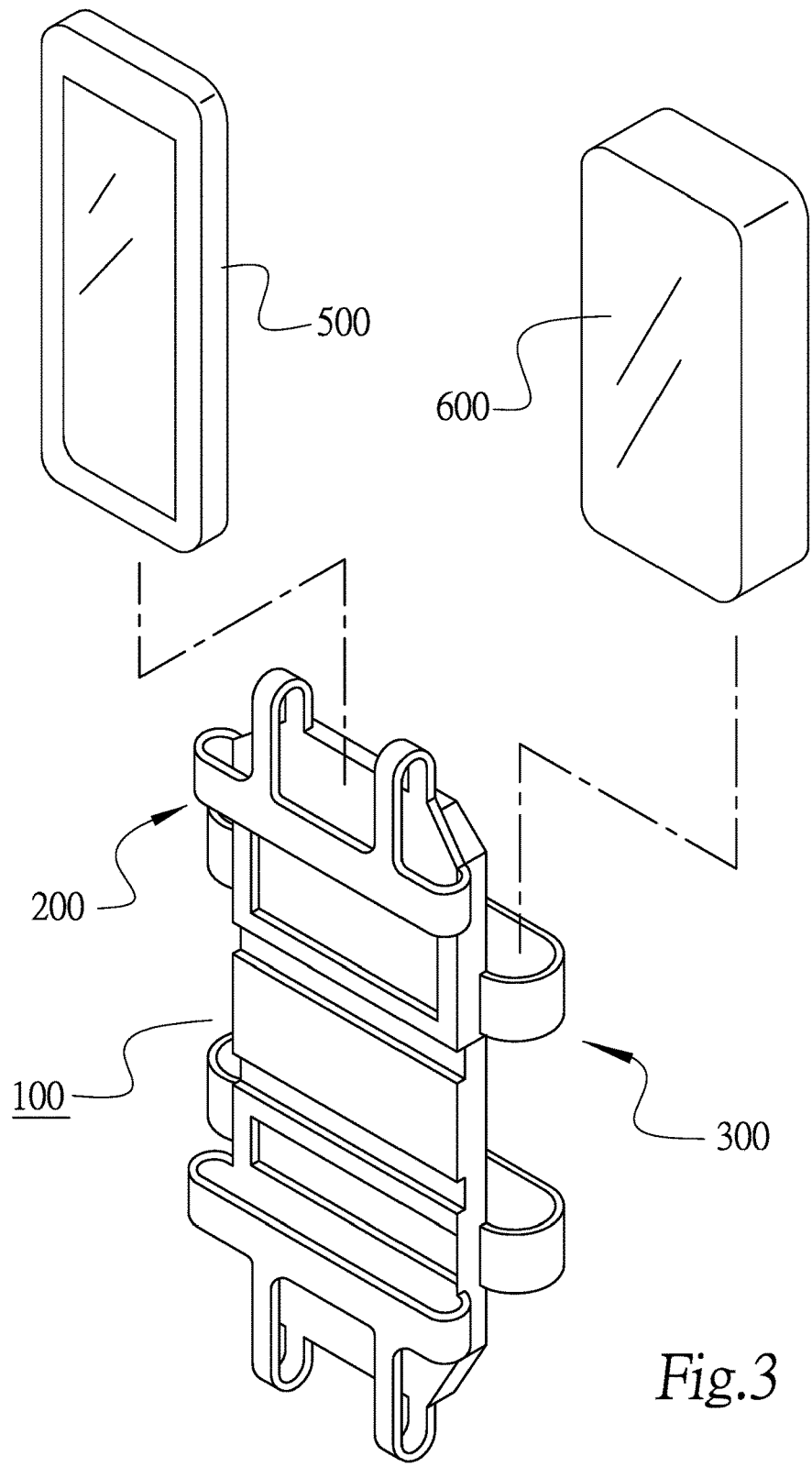
FIG. 3 is a perspective view of the multi-purpose portable power bank and/or mobile phone fixing device before a mobile phone and a power bank put into the bearing seat according to the present invention.
Figure 4:
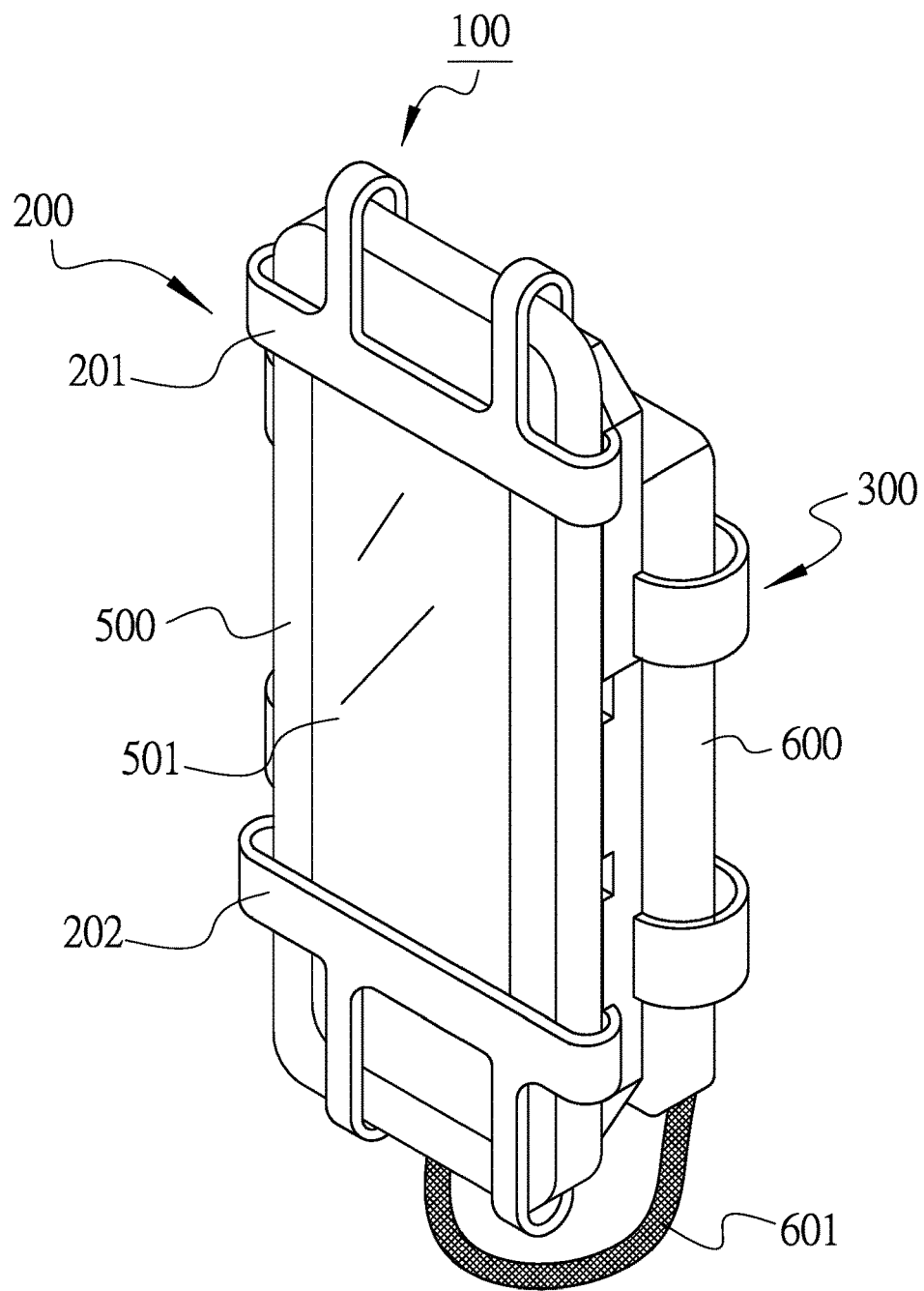
FIG. 4 is a perspective view of the multi-purpose portable power bank and/or mobile phone fixing device after a mobile phone and a power bank put into the bearing seat according to the present invention.

When used, as shown in FIGS. 3 and 4, the mobile phone 500 or the power bank 600 may be individually or simultaneously put into the bearing seat 100, and fixedly tightened by the fitting and pressure bar 200 or the tightening and pressure bar 300; and the mobile phone 500 can be charged by the power bank 600 via a cable 601 at any time.

Since the mobile phone 500 is only held and fixed by the upper pressure bar 201 at the upper end and the lower pressure bar 202 at the lower end, the screen 501 on the mobile phone 500 is not obscured such that the user can directly view the mobile phone message or answer the call, or slide it directly on the screen 501. Also, the mobile phone 500 or power bank 600 can be tightened by a flexible fitting and pressure bar 200 or tightening and pressure bar 300. This achieves a shock effect.

Figure 5:
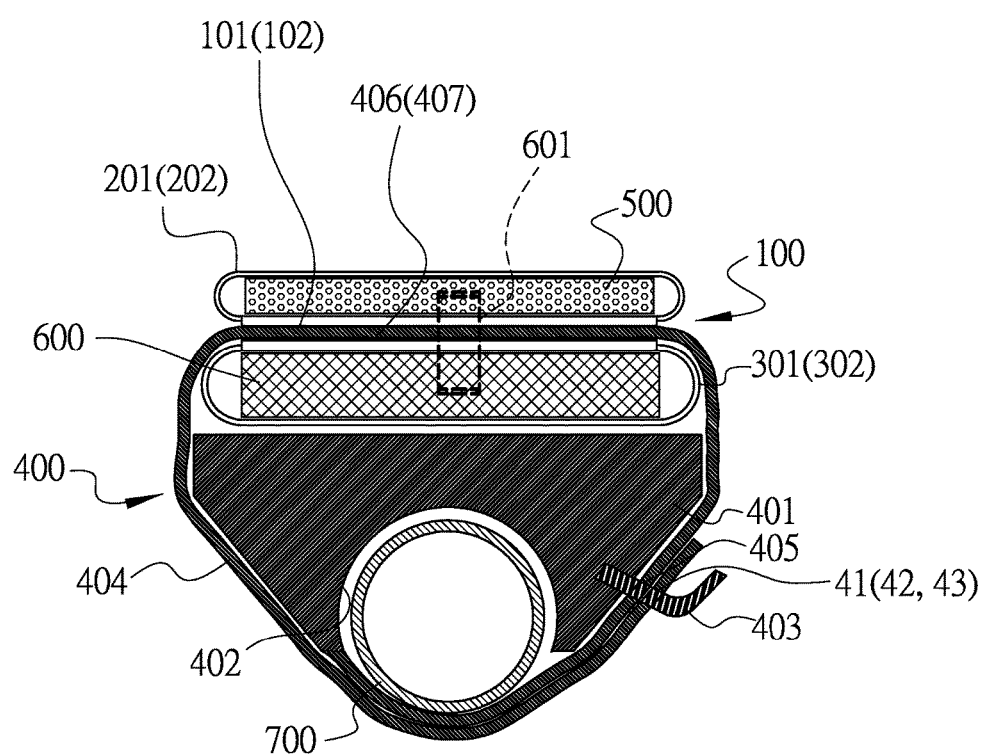
FIG. 5 is a cross-sectional view of the multi-purpose portable power bank and/or mobile phone fixing device according to the present invention.

Please refer to FIG. 5. When the multi-purpose portable power bank and/or mobile phone fixing device of the present invention is mounted to a bicycle (or a motorcycle or other motor bicycle), at first, a recess 402 of a base 401 of the elastic tightening element 400 is attached to the rod 700 of the bicycle, and then the strap 404 is wound around the rod 700 and the base 401, the first buckle portion 405 of the strap 404 is buckled to the steel buckle plate 403 of the base 401. That is, the base 401 and the rod 700 are assembled together fixedly.

Next, the bearing seat 100 on which the power bank 600 is mounted is attached to the back of the base 401, and the strap 404 is wound through the bearing seat 100 such that the side bars 406, 407 of the strap 404 are embedded in the compartment slots 101, 102 of the bearing seat 100, and the inside of the bearing seat 100 on which a mobile phone is mounted is flat. Then, one of the button holes 41, 42, 43 of the strap 404 is buckled to the steel buckle plate 403 of the base 401, such that the bearing seat 100, the elastic tightening element 400, and the rod 700 are assembled together fixedly. When the bearing seat 100 is mounted and then the mobile phone 500 is placed between the upper pressure bar 201 and the lower pressure bar 202 of the bearing seat 100, the mobile phone 500 is further fixed.

Since the mobile phone 500 and the power bank 600 are located on both sides of the bearing seat 100, respectively, when the mobile phone 500 and the power bank 600 are installed, the mobile phone 500 and the power bank 600 can be connected by the cable 601, such that the mobile phone 500 can be always charged by the power bank 600.

When the mobile phone 500 is mounted to the inside of the bearing seat 100, it is only clamped and fixed by the upper pressure bar 201 at the upper end and the lower pressure bar 202 at the lower end. Also, the mobile phone 500 is outside the strap 404 and is not covered by the strap 404, and thus the user can directly view a call or message on a screen of the mobile phone when driving or riding. To make a phone call, the user does not need to remove the mobile phone but slide directly on the mobile phone screen.

Also, since the bearing seat 100 and the elastic tightening element 400 are made of resilient materials, when the mobile phone 500 or the power bank 600 is secured to the bearing seat 100, it is possible to avoid damage due to driving jitter.

Figure 6:
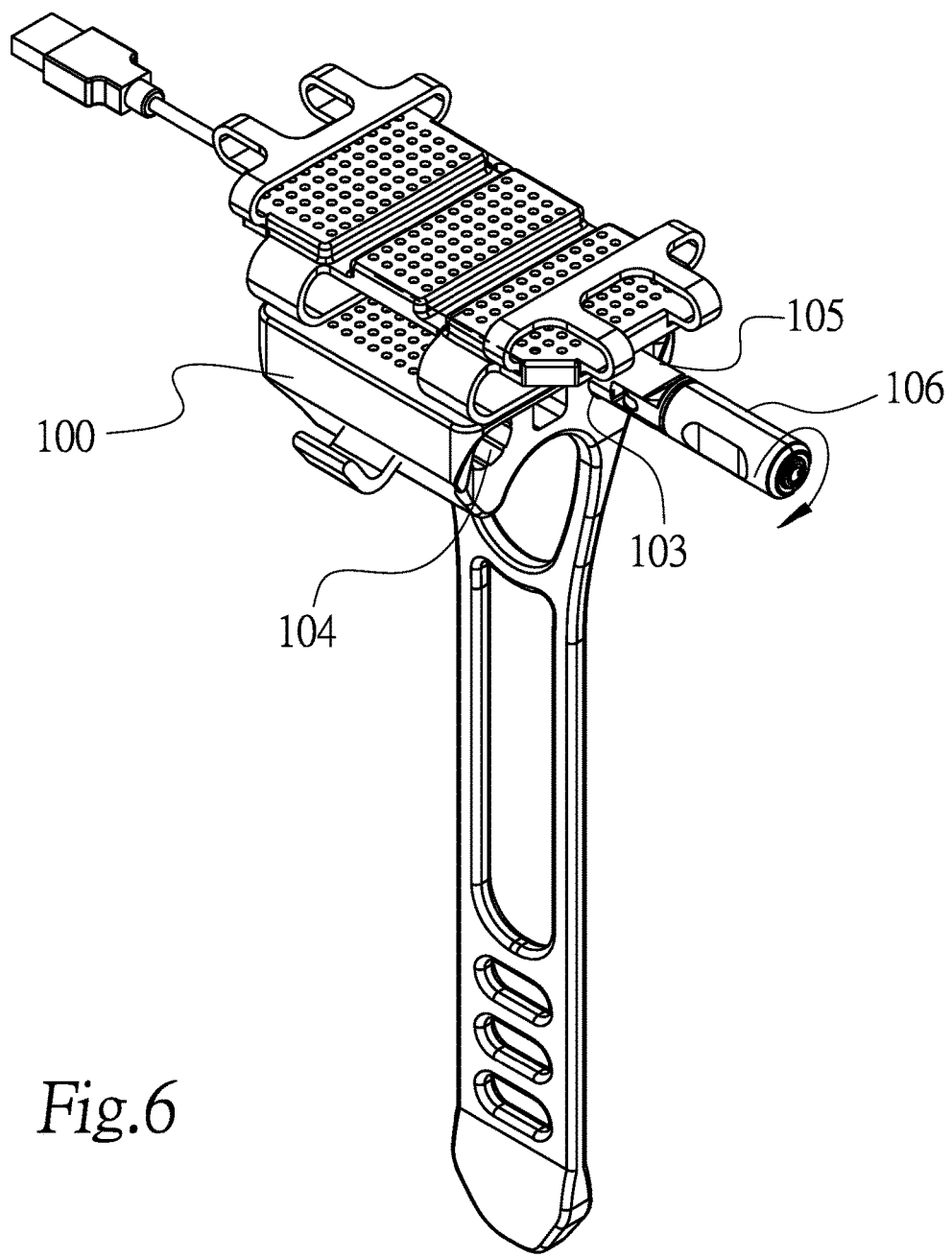
FIG. 6 is an assembled perspective view of the multi-purpose portable power bank and/or mobile phone fixing device according to a second embodiment of the present invention.
Figure 7:
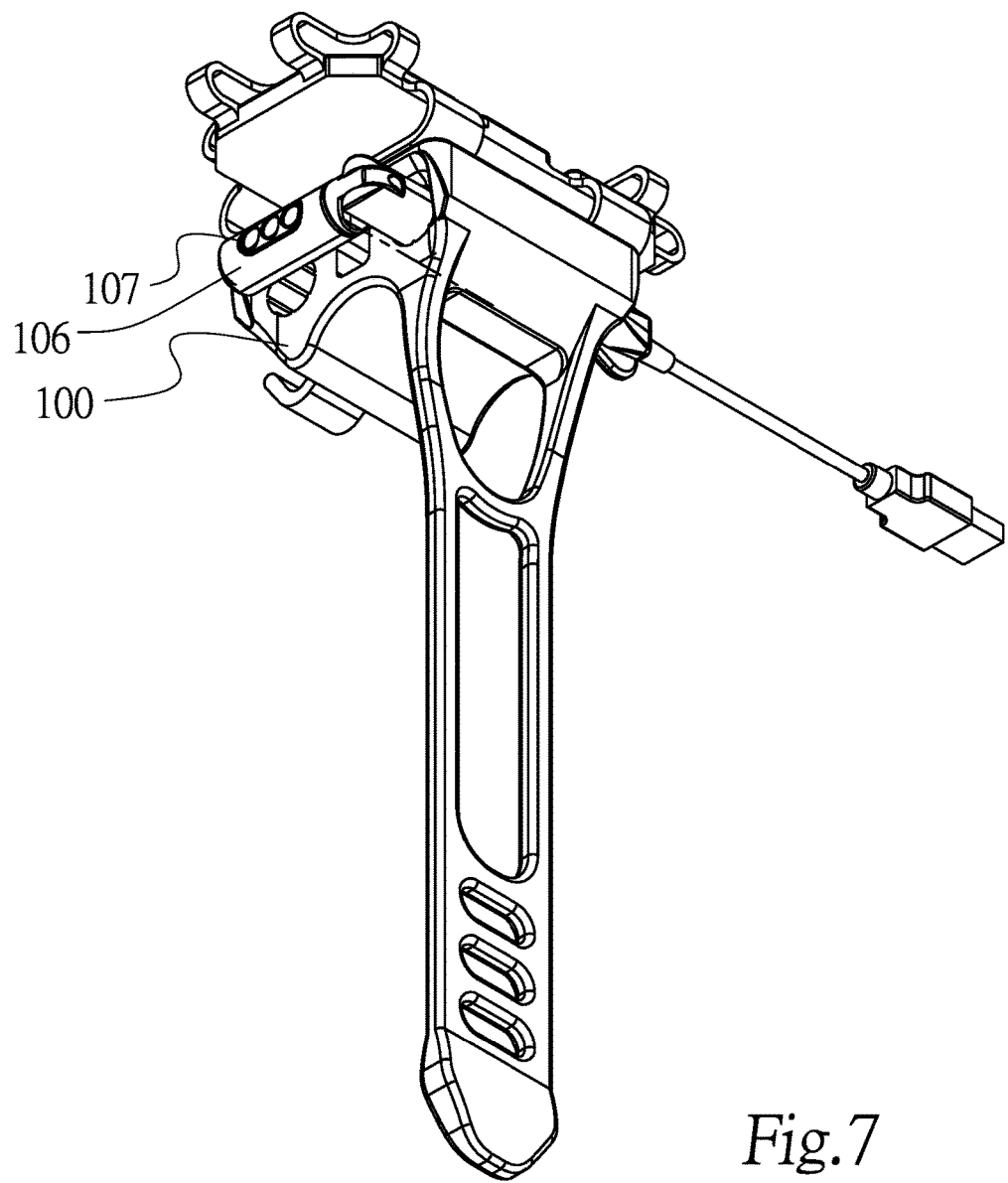
FIG. 7 is an assembled perspective view of the multi-purpose portable power bank and/or mobile phone fixing device according to a third embodiment of the present invention.

Additionally, as shown in FIG. 6, in the multi-purpose portable power bank and/or mobile phone fixing device of the present invention, through holes 103, 104 may be formed on the bearing seat 100. A flashlight 105 or other object can be passed through the through holes 103, 104 and disposed therein, and a head end 106 of the flashlight 105 can be bent and/or rotated. As shown in FIG. 7, the head end 106 of the flashlight 105 is configured with a plurality of LEDs 107, when the head end 106 is bent and/or rotated, the angle of LED's light is adjustable. Accordingly, when the flashlight 105 is mounted to a bicycle, road lighting can be enhanced and security can be increased.

As described above, the multipurpose portable power bank and/or mobile phone fixing device in the present invention is not found in other existing similar items, which possess novelty and practicality undoubtedly, qualifying requirements of patent law, in particular filing a patent application, for your approval.

It should be noted that the described are preferred embodiments. However, the structural features of the present invention are not limited thereto, and changes and modifications may be made to the described embodiments without departing from the scope of the invention as disposed by the appended claims.

What is claimed is:

1. A multi-purpose portable power bank and/or mobile phone fixing device includes a bearing seat in which a set of fitting and pressure bar is provided at one side thereof, and a set of tightening and pressure bar is provided at the opposite side thereof; the fitting and pressure bar and the tightening and pressure bar are integrally formed with the bearing seat for tightening a mobile phone and/or a power bank respectively; after a mobile phone and/or a power bank are mounted fixedly to a fixing device, the fixing device is configured in a way such that the mobile phone is able to be charged by the power bank via a cable at any time, in an instance where a power bank is provided, wherein the said fitting and pressure bar includes an upper pressure bar at an upper end and a lower pressure bar at a lower end, for a mobile phone to be elastically fixed and fit therein; the said tightening and pressure bar includes a upper tightening and pressure bar at the upper end and a lower tightening and pressure bar at the lower end, the upper tightening and pressure bar and the lower tightening and pressure bar being ring shaped for a power bank to be elastically tightened and fit therein, wherein the upper pressure bar and the lower pressure bar of the tightening and pressure bar are connected by two spaced vertical bars and a horizontal bar to form a ring such that after a mobile phone is mounted the mobile phone screen cannot be shielded and able to be directly operated by a user, and wherein an elastic tightening element made of elastic materials is also provided, the elastic tightening element having a base where one end thereof being provided with a recess which is able to be fitted to a rod of a bicycle, and the opposite end thereof being integrally formed with an outwardly extending strap, wherein a steel buckle plate is provided at one side of the said base, and a first buckle portion is provided on the said strap, such that the first buckle portion can buckle the steel buckle plate after the said strap is wound, and the said base is assembled to the bicycle's rod.

2. The multi-purpose portable power bank and/or mobile phone fixing device as claimed in claim 1, wherein a plurality of button holes are provided on the said strap such that the button holes buckle the steel buckle plate after the said bearing seat is wound, and then the said base and bearing seat are assembled to the bicycle's rod.

3. The multi-purpose portable power bank and/or mobile phone fixing device as claimed in claim 2, wherein side bars are hollowed out by an intermediate side on the said strap, and spaced compartment slots are formed on a surface of the fitting and pressure bar on the said bearing seat; whereby the said strap is wound around the said bearing seat and the said side bar is embedded in the compartment slot of the bearing seat such that the mobile phone is placed inside the fitting and pressure bar, the back of the mobile phone can be attached to the bearing seat and the outer surface of the strap, and the mobile phone screen will not be shielded by the said strap.

4. The multi-purpose portable power bank and/or mobile phone fixing device as claimed in claim 3, wherein a through hole is formed on the said bearing seat for a flashlight or other object to be disposed therethrough.

5. A multi-purpose portable power bank and/or mobile phone fixing device includes a bearing seat in which a set of fitting and pressure bar is provided at one side thereof, and a set of tightening and pressure bar is provided at the opposite side thereof; the fitting and pressure bar and the tightening and pressure bar are integrally formed with the bearing seat for tightening a mobile phone and/or a power bank respectively; after a mobile phone and/or a power bank are mounted fixedly to a fixing device, the mobile phone is able to be charged by the power bank via a cable at any time in an instance where a power bank is provided, wherein the said fitting and pressure bar includes an upper pressure bar at an upper end and a lower pressure bar at a lower end, for a mobile phone to be elastically fixed and fit therein; the said tightening and pressure bar includes a upper tightening and pressure bar at the upper end and a lower tightening and pressure bar at the lower end, the upper tightening and pressure bar and the lower tightening and pressure bar being ring shaped for a power bank to be elastically tightened and fit therein, wherein the upper pressure bar and the lower pressure bar of the tightening and pressure bar are connected by two spaced vertical bars and a horizontal bar to form a ring such that after a mobile phone is mounted the mobile phone screen cannot be shielded and is able to be directly operated by user, wherein an elastic tightening element made of elastic materials is also provided, the elastic tightening element having a base where one end thereof being provided with a recess which is able to be fitted to a rod of a bicycle, and the opposite end thereof being integrally formed with an outwardly extending strap, wherein a steel buckle plate is provided at one side of the said base, and a first buckle portion is provided on the said strap, such that the first buckle portion is able to buckle the steel buckle plate after the said strap is wound, and the said base is assembled to the bicycle's rod, wherein a plurality of button holes are provided on the said strap such that the button holes buckle the steel buckle plate after the said bearing seat is wound, and then the said base and bearing seat are assembled to the bicycle's rod, wherein side bars are hollowed out by an intermediate side on the said strap, and spaced compartment slots are formed on a surface of the fitting and pressure bar on the said bearing seat; whereby the said strap is wound around the said bearing seat and the said side bar is embedded in the compartment slot of the bearing seat such that the mobile phone is placed inside the fitting and pressure bar, the back of the mobile phone is able to be attached to the bearing seat and the outer surface of the strap, and the mobile phone screen will not be shielded by the said strap, wherein a through hole is formed on the said bearing seat for a flashlight to be disposed therethrough, and wherein a head end of said flashlight is configured with a plurality of LEDs, and the said head end is able to be bent and/or rotated such that the angle of the LED's light is adjustable.

* * * * *